United States Patent
Kim et al.

(10) Patent No.: US 9,548,806 B2
(45) Date of Patent: Jan. 17, 2017

(54) RADIO MEASUREMENT METHOD AND RADIO MEASUREMENT APPARATUS USING MULTI-ANTENNA CHANNEL MULTIPLEX

(71) Applicant: Electronics and Telecommunications Research Institute, Daejeon (KR)

(72) Inventors: Sang Tae Kim, Daejon (KR); Gwangmoon Park, Daejeon (KR); Seong Yun Lee, Daejeon (KR); Haeng Sook Ro, Daejeon (KR); Mi-Kyung Suk, Daejeon (KR); Yong-Seok Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 14/211,812

(22) Filed: Mar. 14, 2014

(65) Prior Publication Data

US 2015/0071310 A1 Mar. 12, 2015

(30) Foreign Application Priority Data

Sep. 10, 2013 (KR) .................... 10-2013-0108586

(51) Int. Cl.
*H04B 7/08* (2006.01)

(52) U.S. Cl.
CPC ............ *H04B 7/0874* (2013.01); *H04B 7/086* (2013.01)

(58) Field of Classification Search
CPC ..... H04B 7/0874; H04B 7/086; H04B 7/0469; H04B 7/084
See application file for complete search history.

(56) References Cited

U.S. PATENT DOCUMENTS

| | | | | |
|---|---|---|---|---|
| 2006/0126753 A1* | 6/2006 | Jwa | ..................... | H04B 1/71052 375/267 |
| 2007/0135168 A1* | 6/2007 | Liu | .......................... | H01Q 3/40 455/562.1 |
| 2009/0238314 A1 | 9/2009 | Imagawa et al. | | |
| 2010/0135437 A1* | 6/2010 | Lee | ....................... | H04B 1/1036 375/324 |
| 2010/0197261 A1* | 8/2010 | Zibrik | ................... | H04B 7/0871 455/232.1 |
| 2012/0007790 A1 | 1/2012 | Shtrom et al. | | |
| 2012/0105285 A1 | 5/2012 | Park et al. | | |
| 2012/0146840 A1* | 6/2012 | Ookawa | ................ | G01S 7/4004 342/165 |
| 2012/0162004 A1 | 6/2012 | Kim et al. | | |
| 2014/0159954 A1* | 6/2014 | Stoddard | ................. | G01S 3/023 342/359 |

FOREIGN PATENT DOCUMENTS

KR 1020080113245 A 12/2008

* cited by examiner

*Primary Examiner* — Christopher Grey
(74) *Attorney, Agent, or Firm* — William Park & Associates Ltd.

(57) ABSTRACT

A radio measurement apparatus comprising: an array antennal selection unit selecting array antennas corresponding to received signals; a reference path selection unit selecting a reference array antenna; a signal processing unit selecting a reference antenna channel through analysis of signal characteristics measured through two reception channels; a sequential channel multiplex unit determining sequentially inputting received signals of remaining array antennas to output the sequentially input signals to a receiver; and a correction signal input unit compensating amplitude and phase characteristics of the respective reception channels.

14 Claims, 7 Drawing Sheets

100
RADIO MEASUREMENT METHOD AND RADIO MEASUREMENT APPARATUS USING MULTI-ANTENNA CHANNEL MULTIPLEX

RELATED APPLICATIONS

This application claims the benefit of Korean Patent Application No. 10-2013-0108586, filed on Sep. 10, 2013, which is hereby incorporated by reference as if fully set forth herein.

FIELD OF THE INVENTION

The present invention relates generally to radio measurement, and more particularly to a radio measurement method and a radio measurement apparatus using multi-antenna channel multiplex, which can reduce radio wave shadow influence, reduce noise using dual channel phase-spectrum analysis and dual channel cross spectrum, and measure signal arrival direction of a multi-channel signal more accurately by variably selecting a reference antenna from an antenna array that can avoid radio wave shadow in a possible signal arrival direction with respect to a received channel and measuring radio waves through a channel multiplex with respect to other antenna arrays in the radio measurement apparatus for signal spectrum measurement and signal direction estimation.

BACKGROUND OF THE INVENTION

In general, a cross-correlation technology using multiple array antennas is a technology that is generally applied in the signal processing fields, such as digital beam forming and direction detection technologies using phase delay factors that evaluate signal arrival direction in the configuration of a radio receiving apparatus. Spatial modeling of an arrival signal through a correlation technique is to evaluate signal arrival direction estimation parameters for maximizing signal power by extracting a characteristic value for an array antenna response characteristic of the arrival signal or digitally adding a phase delay value to an antenna with respect to the signal arrival direction.

FIG. 1 is a diagram illustrating the configuration of a dual channel direction detection apparatus using a multi-band array antenna in the related art, and may include an array antenna 100, an array antenna selection unit 102, and a sequential channel multiplex 104.

In the dual channel direction detection apparatus as illustrated in FIG. 1, however, spatial filtering and signal arrival direction estimation through beam forming using the array antenna 100 requires configuration of a digitizer for signals from a plurality of spatial array antennas and a device for multi-channel phase synchronization for sampling time, that is, sampling clock, for signal collection, and it is required to use phase correction technology or the like using a correction signal for a multi-channel reception channel path to perform such operations.

In general, phase delay parameter values of respective antenna responses in the signal arrival direction may be extracted with respect to sampling-synchronized signals that are received from a plurality of array antennas, or in contrast, signal spectrum measurement through the beam forming may be performed through application of the phase delay parameters of the extracted array antenna responses.

The array antenna configuration has the problem that it may accompany performance deterioration due to the radio shield phenomenon of an antenna mast for supporting the array antenna or antenna elements. Accordingly, in the radio measurement system for the signal spectrum measurement and signal direction estimation, a reference receiving channel is selected, and the measurement is performed using correlations in amplitude, phase, and time delay between the signal characteristics of the reference receiving channel and the signal characteristics of receiving channels of other array antennas.

However, it is inefficient in space and cost to configure a radio receiving apparatus that is composed of a plurality of receiving channels corresponding to antenna channels in the radio measurement system.

Further, if the received signal characteristics of the reference receiving channel are not satisfactory due to the radio wave shadow of the antenna or the mast, the overall radio measurement is affected thereby.

SUMMARY OF THE INVENTION

In view of the above, the present invention provides a radio measurement method and a radio measurement apparatus using multi-antenna channel multiplex, which can reduce radio wave shadow influence, reduce noise using dual channel phase-spectrum analysis and dual channel cross spectrum, and measure signal arrival direction of a multi-channel signal more accurately by variably selecting a reference antenna from an antenna array that can avoid radio wave shadow in a possible signal arrival direction with respect to a received channel through a pre-measurement stage, and measuring radio waves through a channel multiplex with respect to other antenna arrays in the radio measurement apparatus for signal spectrum measurement and signal direction estimation.

In accordance with the present invention, there is provided a radio measurement apparatus, which includes: an array antenna selection unit selecting array antennas corresponding to received signals among multi-band array antennas; a reference path selection unit selecting a reference array antenna for preferentially performing an antenna reception operation with respect to a reference target channel among the selected array antennas; a signal processing unit selecting a reference antenna channel through analysis of signal characteristics measured through two reception channels for two target reference antenna paths; a sequential channel multiplex unit determining the selected reference channel as a first receiver channel and sequentially inputting received signals of remaining array antennas to output the sequentially input signals to a receiver; and a correction signal input unit compensating amplitude and phase characteristics of the respective reception channels after the array antennas are selected.

In the embodiment, the reference path selection unit selects two target antennas having no influence of radio wave shadow in possible signal arrival directions with respect to an antenna array, and selects the reference antenna path as the first receiver channel from the signals received from the two reference target antennas prior to normal measurement using the sequential channel multiplex unit.

In the embodiment, the sequential channel multiplex unit performs sequential multiplexing in time synchronization with the reference array antenna with respect to the antenna array except for the reference channel.

In the embodiment, the signal processing unit determines the antenna having no radio wave shadow as a reference antenna channel by selecting the reference antenna channel through evaluation of the received signals of the two reference target antenna channels and determining a control signal for selecting the reference antenna channel as a first receiver prior to the normal sequential measurement using the sequential channel multiplex unit.

In the embodiment, the signal processing unit measures signal spectrums through evaluation of signal synthesis values of the two reception channels, and improves a reception gain through synthesis of the delay signals between the reception channels.

In the embodiment, the signal processing unit calculates cross-correlation spectrums through frequency conversion with respect to the signals received from the two reception channels to reduce non-correlation noise of the individual channels.

In the embodiment, the signal processing unit measures spectrum values of phase delay of the respective signals through calculation of time sample correlation values, and calculates signal phase delay coordinates or signal arrival direction coordinates of plural signal spectrums in a measurement band.

In accordance with the present invention, there is provided a radio measurement method, which includes: selecting array antennas corresponding to a received signal frequency band among multi-band array antennas; selecting a target reference array antenna for preferentially performing an antenna reception operation with respect to a reference target channel according to a possible signal arrival direction among the selected array antennas; selecting a reference antenna channel through analysis of signal characteristics measured through two reception channels for two target reference antenna paths; determining the selected reference channel as a first receiver channel and sequentially inputting received signals of remaining array antennas to output the sequentially input signals to a receiver; and compensating amplitude and phase characteristics of the respective reception channels after the array antennas are selected.

In accordance with the present invention, there is provided a radio measurement method, which includes: selecting an optimum reference signal reception channel using sequential time multiplex operation with respect to sparse dual reception channel from multiple array antennas; receiving a dual-channel sync signal using sequential time multiplex operation with respect to received signals from reference antennas and received signals from other array antennas; analyzing dual-channel cross-spectrum through frequency conversion from the received dual-channel sync collection signal and generating signal phase delay spectrums; constructing an array antenna response matrix with respect to the received signals; and estimating arrival directions of the received signals and measuring phase delay parameters and radio spectrums.

In accordance with the present invention, a reference antenna is selected from two antenna arrays that can avoid radio wave shadow in a possible signal arrival direction with respect to a received channel, and radio waves are measured through a channel multiplex with respect to other antenna arrays in the radio measurement apparatus for signal spectrum measurement and signal direction estimation. Accordingly, radio wave shadow influence can be reduced, noise can be reduced using dual channel phase-spectrum analysis and dual channel cross spectrum and the signal arrival direction of a multi-channel signal can be measured more accurately.

BRIEF DESCRIPTION OF THE DRAWINGS

The objects and qualities of the present invention will become apparent from the following description of embodiments given in conjunction with the accompanying drawings, in which.

DETAILED DESCRIPTION OF THE EMBODIMENTS

Hereinafter, the operation principle of the present invention will be described in detail with reference to the accompanying drawings. In explaining the present invention, a detailed description of known functions and configurations incorporated herein will be omitted when it may make the subject matter of the present invention rather unclear. Also, the following terms are defined considering functions of the present invention, and may be differently defined according to the intention of an operator or custom. Therefore, the terms should be defined based on the overall contents of the specification.

Figure 1:
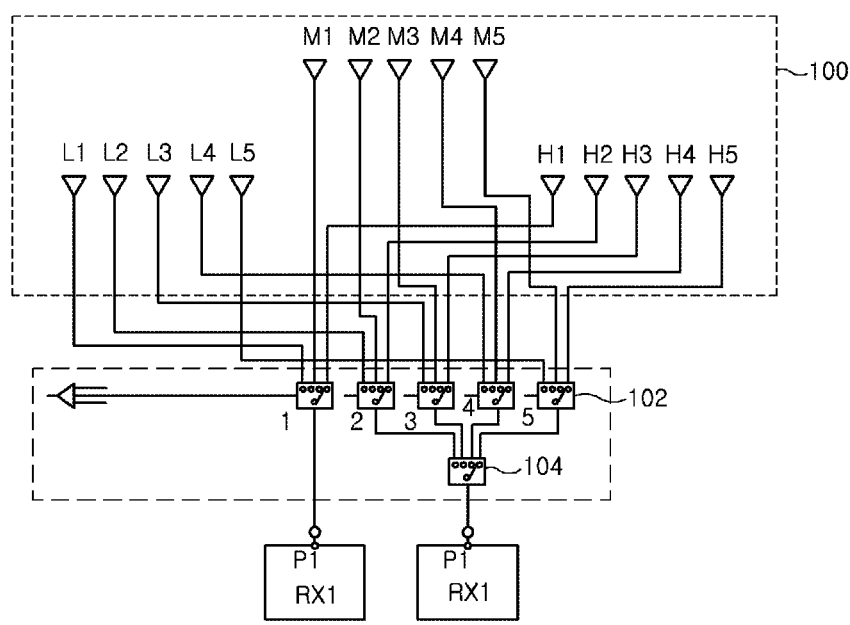
FIG. 1 is a diagram illustrating the configuration of a dual-channel direction detection system using a multi-band array antenna in the related art.
Figure 2:
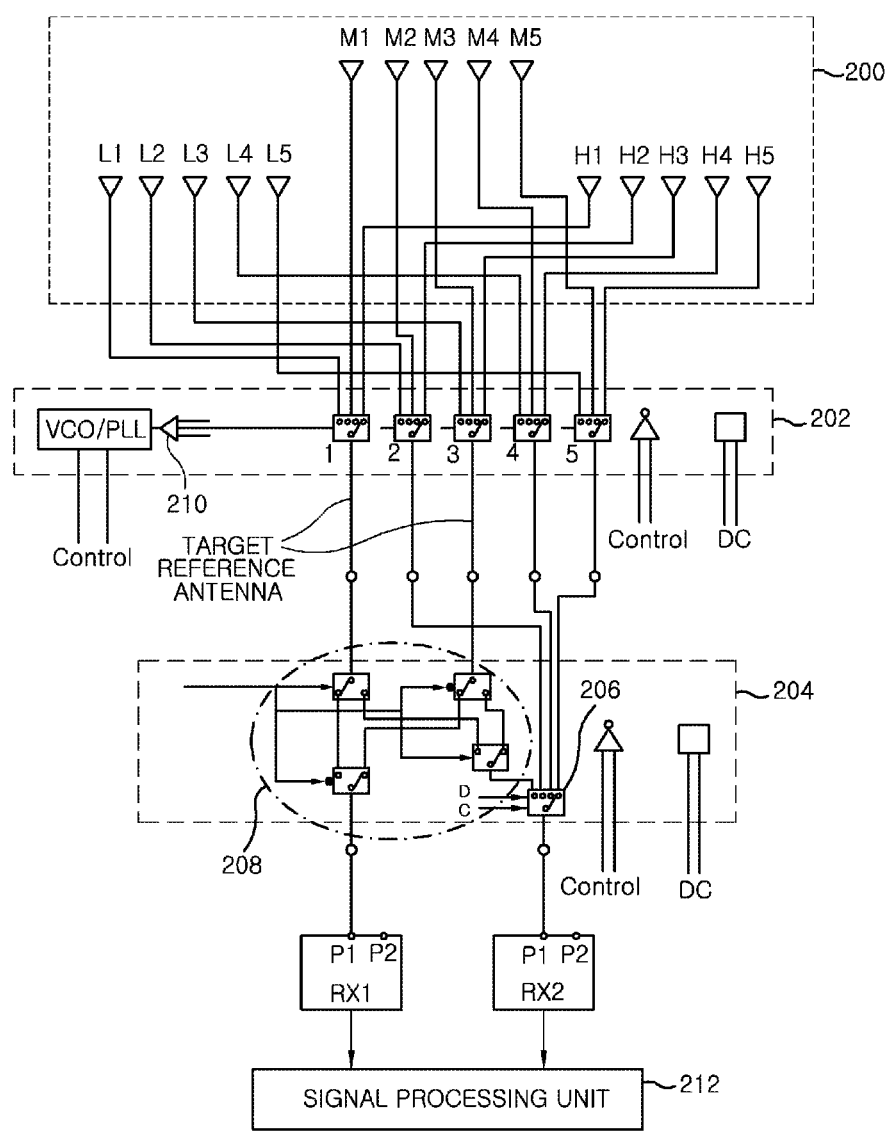
FIG. 2 is a diagram illustrating the configuration of a dual-channel radio measurement system using a reference channel variation technology according to an embodiment of the present invention.

FIG. 2 is a diagram illustrating the configuration of a dual-channel radio measurement system using a reference channel variation technology according to an embodiment of the present invention, Referring to FIG. 2, a multi-channel array antenna unit includes a plurality of multi-channel antennas for receiving different frequency band signals. In the present invention, it is exemplified that five antennas having different reception frequency bands LOW, MIDDLE, and HIGH are provided.

An array antenna selection unit 202 selects array antennas corresponding to a received signal frequency band among multi-band array antennas in an array antenna unit 200. A path selection unit 204, which includes channel switches, selects a reference array antenna for preferentially performing an antenna reception operation with respect to a reference target channel.

A sequential channel multiplex unit 206 determines the selected reference channel as a first receiver channel and sequentially inputs received signals of the remaining array antennas to output the sequentially input signals to a receiver. A reference antenna selection unit 208 analyzes signal characteristics measured through two target reference antenna reception channels, selects one reference antenna channel, and allocates the selected reference antenna channel as a first reception channel.

Further, a signal processing unit 212 measures signal spectrums through evaluation of signal synthesis values of the two reception channels, and synthesizes the delay signals to improve reception gains. Further, in order to reduce non-correlation noise of an individual channel, cross-correlation spectrums are calculated through performing of frequency conversion with respect to the signals received from the two reception channels.

Further, the signal processing unit 212 measures spectrum values of phase delay of the respective signals through calculation of the temporal sample correlation values, and calculates signal phase delay coordinates or signal arrival direction coordinates of the plurality of signal spectrums in a measurement band.

The correction signal input unit 210 compensates amplitude and phase characteristics of the respective reception channels in the array antenna selection step or the subsequent step.

In an actual environment, a radiation signal from a transmitter is not independent of the signals received from the array reception antenna in the signal direction, but correlates with the received signals.

In the proposed technology, the response characteristics of the array antennas in all estimatable signal arrival directions, that is, time delay of two reception antennas that are spatially arranged, that is, relative phase characteristics, may be defined as a signal arrival angle estimation vector. In such a linear time invariant antenna system, relative average values of the array antenna responses at respective azimuth angles with respect to time evolution may be expressed as a function of $x(f)$ that has the characteristics of $E(x(t1)=E(x(t2))$.

Accordingly, in the linear time invariant system in which the antenna azimuth angle response $X(\theta)$ in the ideal true direction has the azimuth angle response characteristics $Y(\theta)$ of the array antennas in the signal incident direction in the real environment, the azimuth angle correlation estimation value of the relative correlation value in the true azimuth can be estimated from the correlation response characteristic values $R_{XY}(\theta)$ of two signals.

Through the proposed correlation technique, the real environment array antenna response noise by means of the phase delay of the respective incident signals with respect to the azimuth angles has non-correlational relationship, and thus the estimation accuracy and precision can be improved.

$$R_{XY}(\theta)R_{XX}(\theta)*h(\theta)$$

$$R_{XY}(\theta)=\int_{-\infty}^{\infty}R_{XX}(\theta-\theta_1)h(\theta_1)d\theta_1 \quad \text{[Equation 1]}$$

As in Equation 1 expressing the correlation characteristics of the azimuth angle response, the ideal azimuth angle response characteristic value $X(\theta)$ of the frequency or wavelength dependent signal and the incident signal response characteristic $Y(\theta)$ of the linear time invariant array antenna in the real environment are determined by the correlation function of the response function $h(\theta)$ of the array antenna in the reception environment.

However, the spatial filtering through the beam forming and signal arrival direction estimation using the array antennas requires configuration of a digitizer for signals from a plurality of spatial array antennas and a device for multi-channel phase synchronization for sampling time, that is, sampling clock, for signal collection, and it is required to use phase correction technology or the like using a correction signal for a multi-channel reception channel path to perform such operations.

In general, phase delay parameter values of respective antenna responses in the signal arrival direction may be extracted with respect to synchronized sampling signals that are received from a plurality of array antennas, or in contrast, signal spectrum measurement through the beam forming may be performed through application of the phase delay parameters of the extracted array antenna responses.

An embodiment of the present invention proposes an efficient apparatus for the configuration of a radio spectrum measurement and direction estimation system that includes five circularly arranged antennas having sparse reception channels and dual channel reception channels. That is, the present invention relates to a multi-channel antenna interface apparatus in a radio measurement system for the signal spectrum and signal direction estimation, and as an example, to a sparse dual-channel interface apparatus from a multiplexed broadband antenna array.

In the radio measurement system for the signal direction estimation, the antenna array according to the measurement frequency exerts an influence on the radio measurement performance according to the radius of the array antennas. Accordingly, for the broadband measurement, the antenna array that is divided into a plurality of measurement frequency bands has a multi-configuration according to the radius of the plurality of array antennas.

Figure 3:
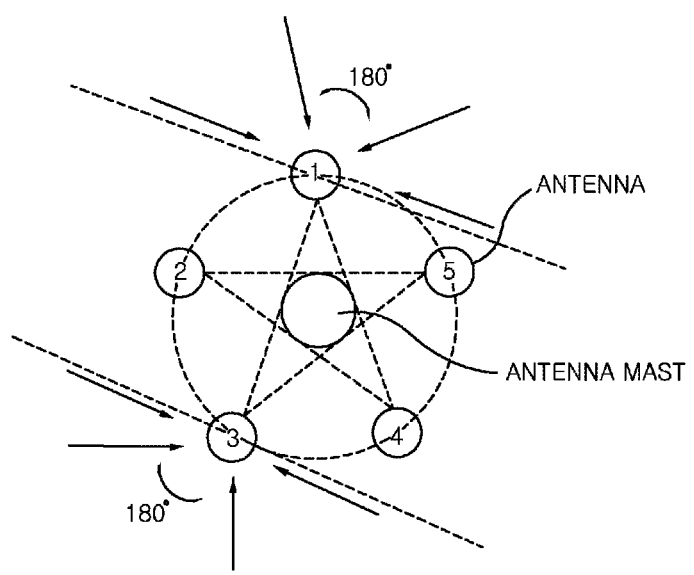
FIG. 3 is a conceptual diagram of an array antenna synthesis reference channel configuration according to an embodiment of the present invention and a variable reference channel antenna configuration according to all 360° signal arrival directions.

FIG. 3 is a conceptual diagram of an array antenna synthesis reference channel configuration according to an embodiment of the present invention and a variable reference channel antenna configuration according to 360° signal arrival directions.

In the case of five array antennas as shown in FIG. 3, in order to reduce the radio wave shadow with respect to the sparse reception channels from the multiple array antennas, the system is configured so that the first and third array antennas are determined as target reference channel comparison antennas and the two antenna channels are selected according to the respective signal arrival directions, and thus the radio wave shadow influence with respect to possible signal arrival direction of 360° is minimized to enable the system to operate.

Figure 4A:
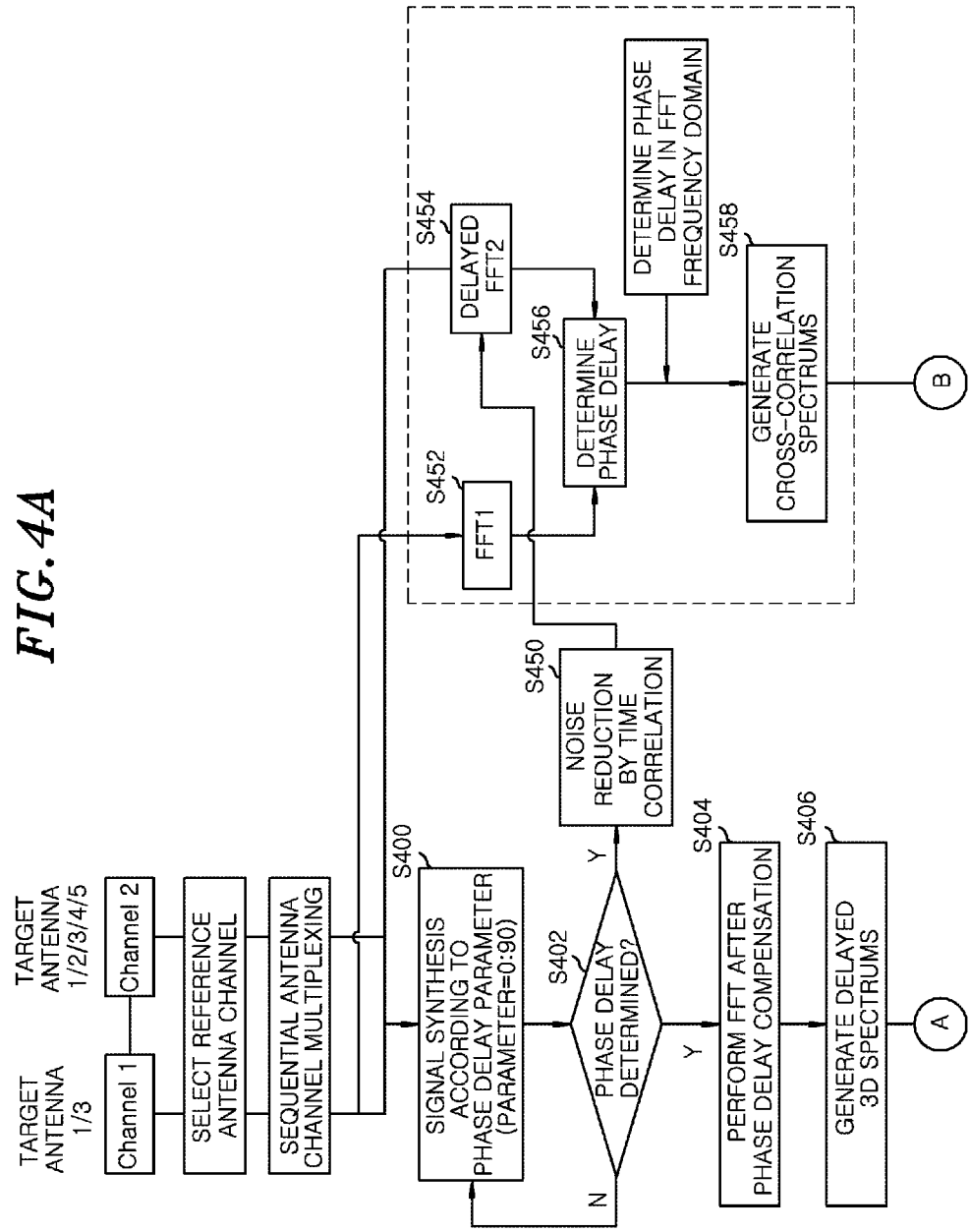
FIGS. 4A and 4B are a flowchart illustrating signal processing of dual-channel variable reference channel selection array antennas according to an embodiment of the present invention.
Figure 4B:
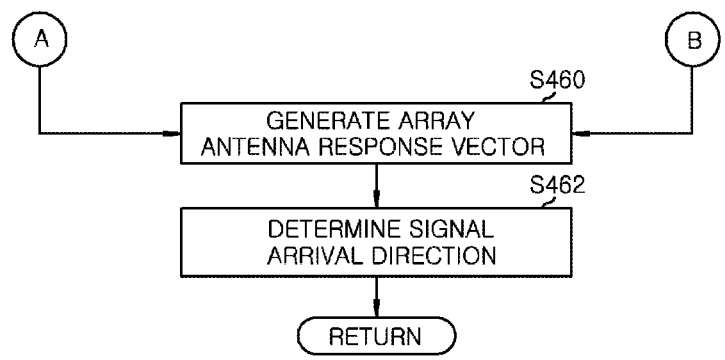

FIGS. 4A and 4B are flowchart illustrating signal processing of dual-channel variable reference channel selection array antennas in a radio measurement apparatus according to an embodiment of the present invention.

Hereinafter, referring to FIGS. 4A and 4B, the signal processing operation of dual-channel variable reference channel selection array antennas will be described in detail.

First, as shown in FIG. 4A, if signals are received through channel 1 and channel 2, the radio measurement apparatus perform signal synthesis according to phase delay parameters sequentially using parameters 0 to 90 until phase delay occurring in signal 1 and signal 2 is determined (S400).

Figure 7:
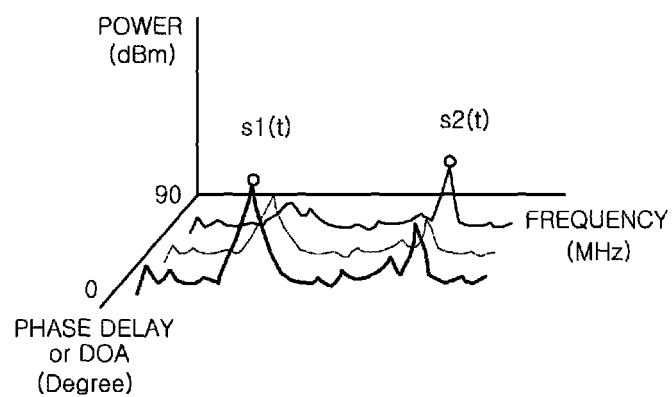

Then, if the phase delay is determined (S402), the radio measurement apparatus compensates for the phase delay, performs FFT with respect to signal 1 and signal 2, of which phase delay is compensated for (S404), and generates signal 1 and signal 2 as 3D frequency spectrums as shown in FIG. 7 (S406).

That is, as shown in FIG. 7, the radio measurement apparatus measures spectrum values of respective phase delays through calculation of time sample correlation values of time domain collected samples through two reception channels, and simultaneously displays estimation of signal arrival directions of plural signal spectrums in the measurement band.

The radio measurement apparatus evaluates the phase delay values of the two reception channels in the antenna directions such as beam forming antenna characteristics, and applies phase delay weight values to the time domain collected samples to make it possible to measure the signal spectrums of the maximum signal collection.

Then, as shown in FIG. 4B, the radio measurement apparatus generates response vectors of the array antennas using the phase delay of signal 1 and signal 2 (S460), and determines the signal arrival directions in which signal 1 and signal 2 received in the array antennas are transmitted using the response vector values of the array antennas (S462).

On the other hand, as shown in FIG. 4A, the radio measurement apparatus performs noise reduction by time correlation using the determined phase delay values in the frequency domain (S450), and performs FFT with respect to the noise-reduced signal 2 and signal 1 (S452 and S454).

Then, the radio measurement apparatus determines the phase delay (S456) after performing the FFT of signal 1 and noise-reduced signal 2, generates dual-channel cross correlation spectrum (S458), and reduces noise included in signal 1 and signal 2.

Figure 5A:
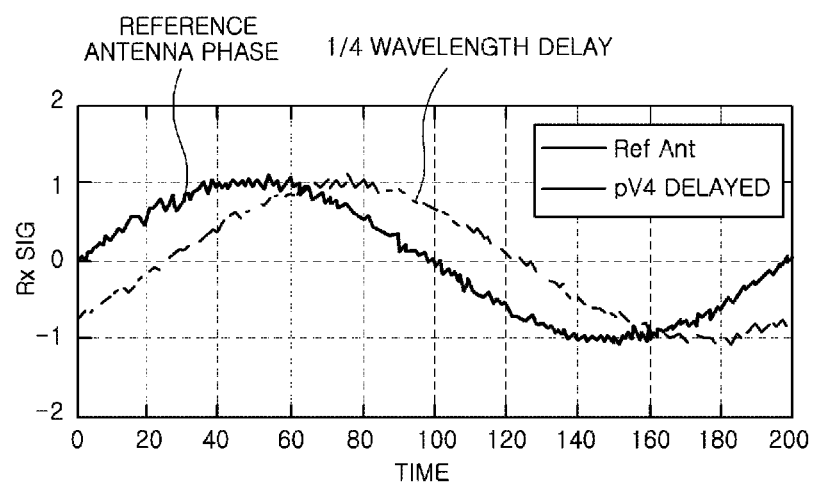
FIGS. 5A and 5B are a conceptual diagram of a signal synthesis operation through cross-correlations of dual-channel reception signals according to a signal arrival direction according to an embodiment of the present invention.
Figure 5B:
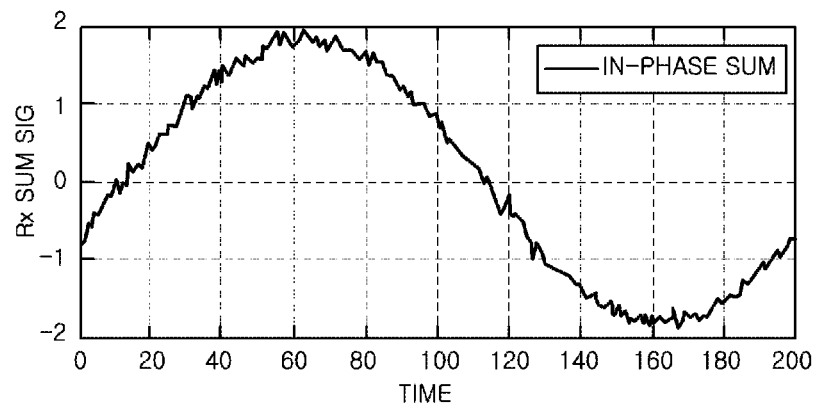

Referring to FIGS. 5A and 5B, the radio measurement apparatus measures cross-spectrums through frequency domain transform (FFT) of one signal spectrum with respect to two acquired channel means and means for improving the reception gain by selecting one channel selected as the reference signal or by evaluating and synthesizing signal synthesis values of two reception channels with respect to proper time domain collected data with respect to the digitized digital signal as the same delay collected signal. Accordingly, the non-correlation noise of the reception antenna channel can be reduced through the measurement apparatus according to the present invention, and thus the SNR of the signal spectrums can be improved.

Figure 6:
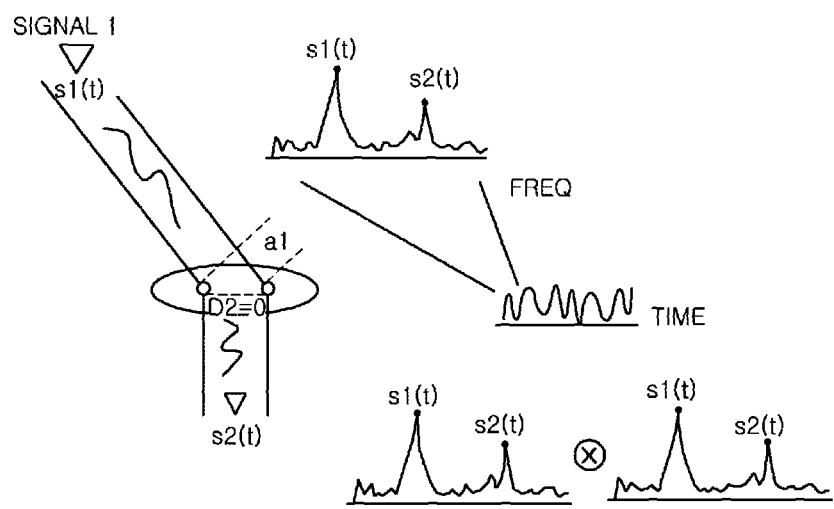
FIGS. 6 and 7 are dual-channel phase delay correlation spectrograms according to an embodiment of the present invention.

Further, referring to FIGS. 6 and 7, the above-described configuration can measure spectrum values of respective phase delays through calculation of time sample correlation values of time domain collected samples through two reception channels, and simultaneously display estimation of signal arrival directions of plural signal spectrums in the measurement band.

The above-described configuration can evaluate the phase delay values of the two reception channels in the antenna directions such as beam forming antenna characteristics, and apply phase delay weight values to the time domain collected samples to make it possible to measure the signal spectrums of the maximum signal collection.

That is, the radio measurement apparatus performs selecting an optimum reference signal reception channel using sequential time multiplex operation with respect to sparse dual reception channel from multiple array antennas, receiving a dual-channel sync signal using sequential time multiplex operation with respect to received signals from reference antennas and received signals from other array antennas, analyzing dual-channel cross-spectrum through frequency conversion from the received dual-channel sync signal and generating signal phase delay spectrums, constructing an array antenna response matrix with respect to the received signals, and estimating arrival directions of the received signals and measuring phase delay parameter weights and radio wave spectrums. Accordingly, the signal-to-noise ratio (SNR) of the received signals is improved, and thus the signal direction detection and signal characteristic measurement performance can be improved.

Although detailed embodiments of the present invention have been described, various modifications may be made without departing from the scope of the present invention. Accordingly, the scope of the present invention should not be defined by the above-described embodiments, but should be defined by the appended claims.

What is claimed is:

1. A radio measurement apparatus comprising:
an array antenna selector selecting array antennas corresponding to received signals among multi-band array antennas;
a reference path selector selecting a reference target antenna for preferentially performing an antenna reception operation with respect to a reference target channel among the selected array antennas;
a signal processor selecting a reference antenna channel through analysis of signal characteristics measured through two reception channels for two reference target antenna paths;
a sequential channel multiplexer determining the selected reference antenna channel as a first reception channel and sequentially inputting received signals of remaining array antennas to output the sequentially input signals to a receiver; and
a correction signal inputter compensating amplitude and phase characteristics of the respective reception channels after the array antennas are selected,
wherein the reference path selector selects two reference target antennas having no influence of radio wave shadow in possible signal arrival directions with respect to an antenna array, and
wherein the two reference target antennas are located such that each of the two reference target antennas provides a non-overlapping 180° signal reception.

2. The radio measurement apparatus of claim 1, wherein the reference path selector selects the reference antenna path as the first reception channel from the signals received from the two reference target antennas prior to normal measurement using the sequential channel multiplexer.

3. The radio measurement apparatus of claim 1, wherein the sequential channel multiplexer performs sequential multiplexing in time synchronization with the reference target antenna with respect to the antenna array except for the reference channel.

4. The radio measurement apparatus of claim 2, wherein the signal processor determines the antenna having no radio wave shadow as the reference antenna channel by selecting the reference antenna channel through evaluation of the received signals of the two reference target antenna channels and determining a control signal for selecting the reference antenna channel as the first reception channel prior to the normal sequential measurement using the sequential channel multiplexer.

5. The radio measurement apparatus of claim 1, wherein the signal processor measures signal spectrums through evaluation of signal synthesis values of the two reception channels, and improves a reception gain through synthesis of the delay signals between the reception channels.

6. The radio measurement apparatus of claim 1, wherein the signal processor calculates cross-correlation spectrums through frequency conversion with respect to the signals received from the two reception channels to reduce non-correlation noise of the individual channels.

7. The radio measurement apparatus of claim 1, wherein the signal processor measures spectrum values of phase delay of the respective signals through calculation of time sample correlation values, and calculates signal phase delay coordinates or signal arrival direction coordinates of plural signal spectrums in a measurement band.

8. A radio measurement method comprising:
selecting array antennas corresponding to a received signal frequency band among multi-band array antennas;

selecting a target reference antenna for preferentially performing an antenna reception operation with respect to a reference target channel according to a possible signal arrival direction among the selected array antennas;

selecting a reference antenna channel through analysis of signal characteristics measured through two reception channels for two reference target antenna paths;

determining the selected reference antenna channel as a first reception channel and sequentially inputting received signals of remaining array antennas to output the sequentially input signals to a receiver; and compensating amplitude and phase characteristics of the respective reception channels after the array antennas are selected, wherein selecting the target reference antenna comprises selecting two reference target antennas having no influence of radio wave shadow in possible signal arrival directions with respect to an antenna array, and wherein the two reference target antennas are located such that each of the two reference target antennas provides a non-overlapping 180° signal reception.

9. The radio measurement method of claim 8, wherein said selecting the target reference antenna comprises:
selecting the reference antenna path as the first reception channel from the signals received from the two reference target antennas prior to normal measurement.

10. The radio measurement method of claim 8, wherein said determining the selected reference channel comprises:
performing sequential multiplexing in time synchronization with the reference target antenna with respect to the antenna array except for the reference channel.

11. The radio measurement method of claim 9, wherein said selecting the reference antenna channel comprises:
determining the antenna having no radio wave shadow as the reference antenna channel by selecting the reference antenna channel through evaluation of the received signals of the two reference target antenna channels; and
determining a control signal for selecting the reference antenna channel as the first reception channel prior to the normal sequential measurement.

12. The radio measurement method of claim 8, wherein said selecting the reference antenna channel comprises:
measuring signal spectrums through evaluation of signal synthesis values of the two reception channels; and
improving a reception gain through synthesis of the delay signals between the reception channels.

13. The radio measurement method of claim 8, wherein said selecting the reference antenna channel comprises:
calculating cross-correlation spectrums through frequency conversion with respect to the signals received from the two reception channels to reduce non-correlation noise of the individual channels.

14. The radio measurement method of claim 8, wherein said selecting the reference antenna channel comprises:
measuring spectrum values of phase delay of the respective signals through calculation of time sample correlation values; and
calculating signal phase delay coordinates or signal arrival direction coordinates of plural signal spectrums in a measurement band.

* * * * *